(12) United States Patent
Knoll et al.

(10) Patent No.: US 6,446,910 B1
(45) Date of Patent: Sep. 10, 2002

(54) SEAT WITH SELF-ADJUSTING SHOULDER HARNESS

(75) Inventors: Frank Knoll, Huntington Station; Joseph Gaito, Levittown, both of NY (US)

(73) Assignee: East/West Industries, Inc., Ronkonkoma, NY (US)

( * ) Notice: Subject to any disclaimer, the term of this patent is extended or adjusted under 35 U.S.C. 154(b) by 0 days.

(21) Appl. No.: 09/668,157

(22) Filed: Sep. 25, 2000

(51) Int. Cl.$^7$ .............................................. B64D 25/06
(52) U.S. Cl. ............................... 244/122 R; 280/801.1; 280/801.2
(58) Field of Search ............................ 244/121, 122 R, 244/122 B, 122 AG; 280/290, 801.2, 801.1

(56) References Cited

U.S. PATENT DOCUMENTS

| | | | |
|---|---|---|---|
| 2,442,375 A | * 6/1948 | Paxton | ......................... 244/122 |
| 2,649,145 A | * 8/1953 | McCarthy | .................... 155/189 |
| 2,650,655 A | * 9/1953 | Neahr et al. | ................. 155/189 |
| 2,853,258 A | * 9/1958 | Polleys | ........................ 244/122 |
| 3,488,090 A | * 1/1970 | Douglas | ...................... 297/389 |
| 4,474,347 A | 10/1984 | Hazelsky | |
| 5,558,301 A | 9/1996 | Kerdoncuff et al. | |
| 5,746,395 A | 5/1998 | Peck et al. | |
| 6,276,721 B1 | * 8/2001 | Romeo | ......................... 280/483 |
| 6,305,713 B1 | * 10/2001 | Pywell et al. | ............. 280/801.1 |
| 6,312,014 B1 | * 11/2001 | Ando et al. | ............... 280/801.2 |

OTHER PUBLICATIONS

SIMULA Inc., "Aircraft Crash Survival Design Guide," prepared for Applied Technology Laboratory U.S. Army Research and Technology Laboratories, Jun. 1980, vol. 4, pp. 129–194.

* cited by examiner

Primary Examiner—Charles T. Jordan
Assistant Examiner—Gabriel Sukman
(74) Attorney, Agent, or Firm—Cahn & Samuels, LLP

(57) ABSTRACT

A seat includes a seat back for supporting a back of a seat occupant and a shoulder harness including at least one shoulder strap for restraining a shoulder of a seat occupant. The shoulder strap has a rear portion anchored in a manner enabling it to move in a height direction of a seat occupant. When the seat occupant tightens the shoulder strap, the rear portion can move in response to the tension to a position in which the shoulder strap extends substantially perpendicular to the back tangent line of the seat occupant. In this manner the shoulder strap can be automatically be adjusted in position for a wide range of seat occupants of varying heights.

20 Claims, 2 Drawing Sheets

SEAT WITH SELF-ADJUSTING SHOULDER HARNESS

BACKGROUND OF THE INVENTION

1. Field of the Invention

This invention relates to an aircraft seat equipped with a self-adjusting shoulder harness that enables the position of the shoulder harness to be automatically adjusted in accordance with the seating height of the seat occupant.

2. Description of the Related Art

The seats of military aircraft are frequently equipped with restraint harnesses for restraining the occupants of the seats against forces experienced during operation of the aircraft. Since the forces which occur aboard a military aircraft during even normal operation can be quite significant, much research has gone into determining the ideal geometry of restraint harnesses for best protecting seat occupants.

Typical restraint harnesses include lap harnesses, which extend partly around the waist region of a seat occupant, and shoulder harnesses, which include one or more shoulder straps each extending over a shoulder of a seat occupant from behind his back to his front and a anti-g strap to prevent submarining. One such restraint system is described in U.S. Pat. No. 5,746,395 (the '395 patent) that is directed to a helicopter seat safety system. The '395 patent discloses a helicopter seat with a harness system. The harness system includes a strap tensioning device that is triggered to tighten the harness straps upon detection of a collision. However, the '395 patent does not address the angular position of the straps with respect to the occupant.

Research on restraint systems has shown that the shoulder straps of a shoulder harness ideally should pass over the shoulders in a plane perpendicular to a line tangent to the back of the seat occupant or at an upward angle with respect to this plane of no greater than 30 degrees. If the shoulder straps pass over the shoulders at an angle below this plane, an undesirable force can be applied to the spine of the seat occupant during a sudden deceleration.

In a conventional seat for a military aircraft, the height of a shoulder harness on the seat is not readily adjustable by the seat occupant and is permanently set at a height appropriate for a seat occupant having a height falling in the 50th percentile of the population expected to be using the seat. As a result, for a tall or short seat occupant having a height significantly different from the height of the 50th percentile, the angle of the shoulder straps with respect to the back of the seat occupant can frequently fall outside of the above-described acceptable range, resulting in forces which are undesirable in magnitude or direction being applied to the back of the seat occupant during a sudden deceleration.

Accordingly, there is a need for an aircraft seat that is readily adjustable to safely accommodate occupants of differing heights.

SUMMARY OF THE INVENTION

The present invention provides a seat equipped with a shoulder harness that can be readily adjusted by a seat occupant to a position appropriate for the height of the seat occupant.

The present invention also provides a method of adjusting a shoulder harness for a seat.

According to one aspect of the present invention, a seat includes a seat back for supporting a back of a seat occupant and a shoulder harness including at least one shoulder strap for restraining a shoulder of a seat occupant. The shoulder strap has a rear portion anchored in a manner enabling it to move in a height direction of a seat occupant. When the seat occupant tightens the shoulder strap, the rear portion can move in response to the tension to a position in which the shoulder strap extends substantially perpendicular to the back tangent line of the seat occupant. In this manner the shoulder strap can be automatically adjusted in position for a wide range of seat occupants of varying heights. In a preferred embodiment, the shoulder strap is anchored on the seat back, but it may also be anchored on a bulkhead or other member supporting the seat. The shoulder harness may have a single shoulder strap, or it may have two shoulder straps, each anchored in a similar manner.

According to another aspect of the present invention, a method of adjusting a shoulder harness for a seat includes placing a shoulder strap of a shoulder harness for a seat over a shoulder of a seat occupant, and tightening the shoulder strap to exert a tensile force on a rear portion of the shoulder strap to move the rear portion in a height direction of the seat occupant. Preferably the rear portion can be moved to a position in which the shoulder strap is approximately perpendicular to a back tangent line of the seat occupant. The method can be performed by a seat occupant in the ordinary course of putting on the shoulder harness and requires no special training on the part of the seat occupant.

In a preferred embodiment, a seat according to the present invention is intended for use in an aircraft, but the seat may be used with any type of conveyance or moving object having a shoulder harness for restraining a seat occupant. For example, it can be used in trains, automobiles, boats, amusement park rides, spacecraft, and test equipment.

DESCRIPTION OF PREFERRED EMBODIMENTS

Figure 1:
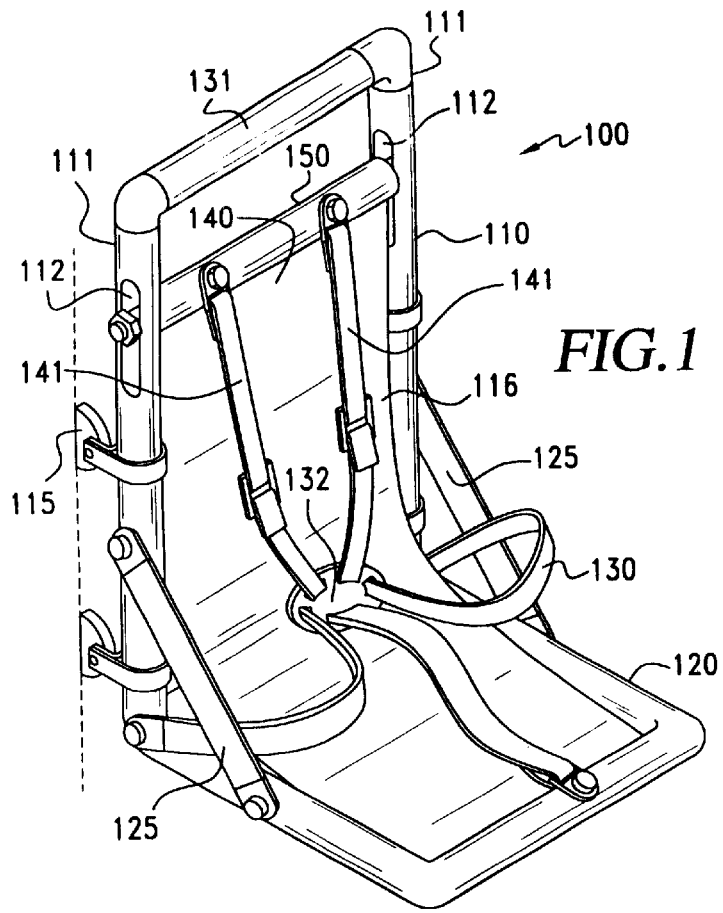
FIG. 1 is a perspective view of an embodiment of a seat according to the present invention.
Figure 2:
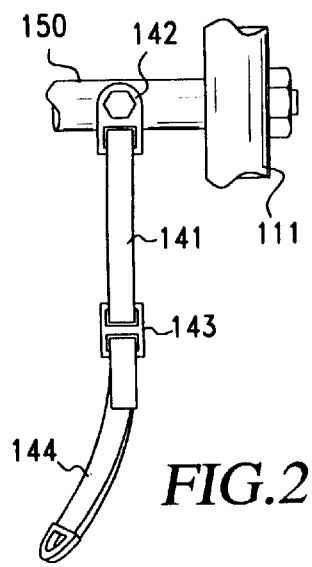
FIG. 2 is a front elevation of one of the shoulder straps of the embodiment of FIG. 1.
Figure 3A:
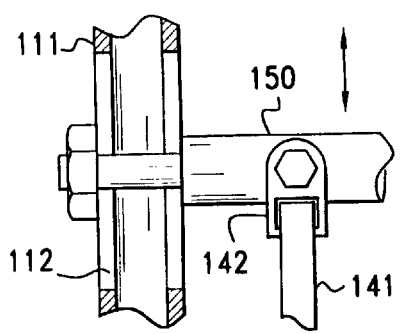
FIG. 3A is an enlarged front view, in partial cross-section, of one end of the support bar of the embodiment of FIG. 1.
Figure 3B:
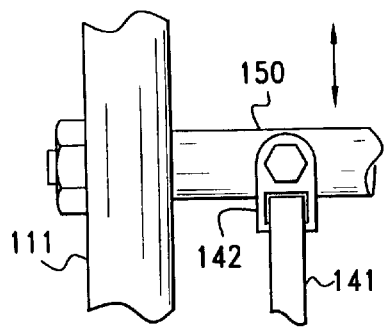
FIG. 3B is an enlarged back view of one end of the support bar of the embodiment of FIG. 1.
Figure 3C:
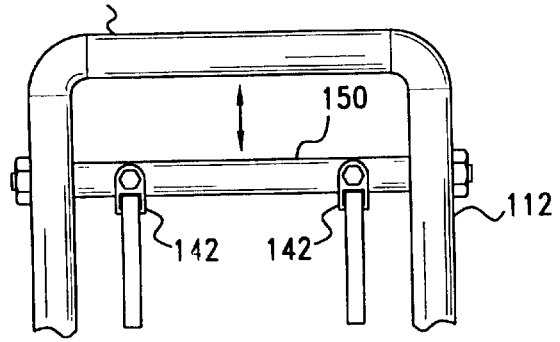
FIG. 3C is a front view of the support bar of the embodiment of FIG. 1.
Figure 4:
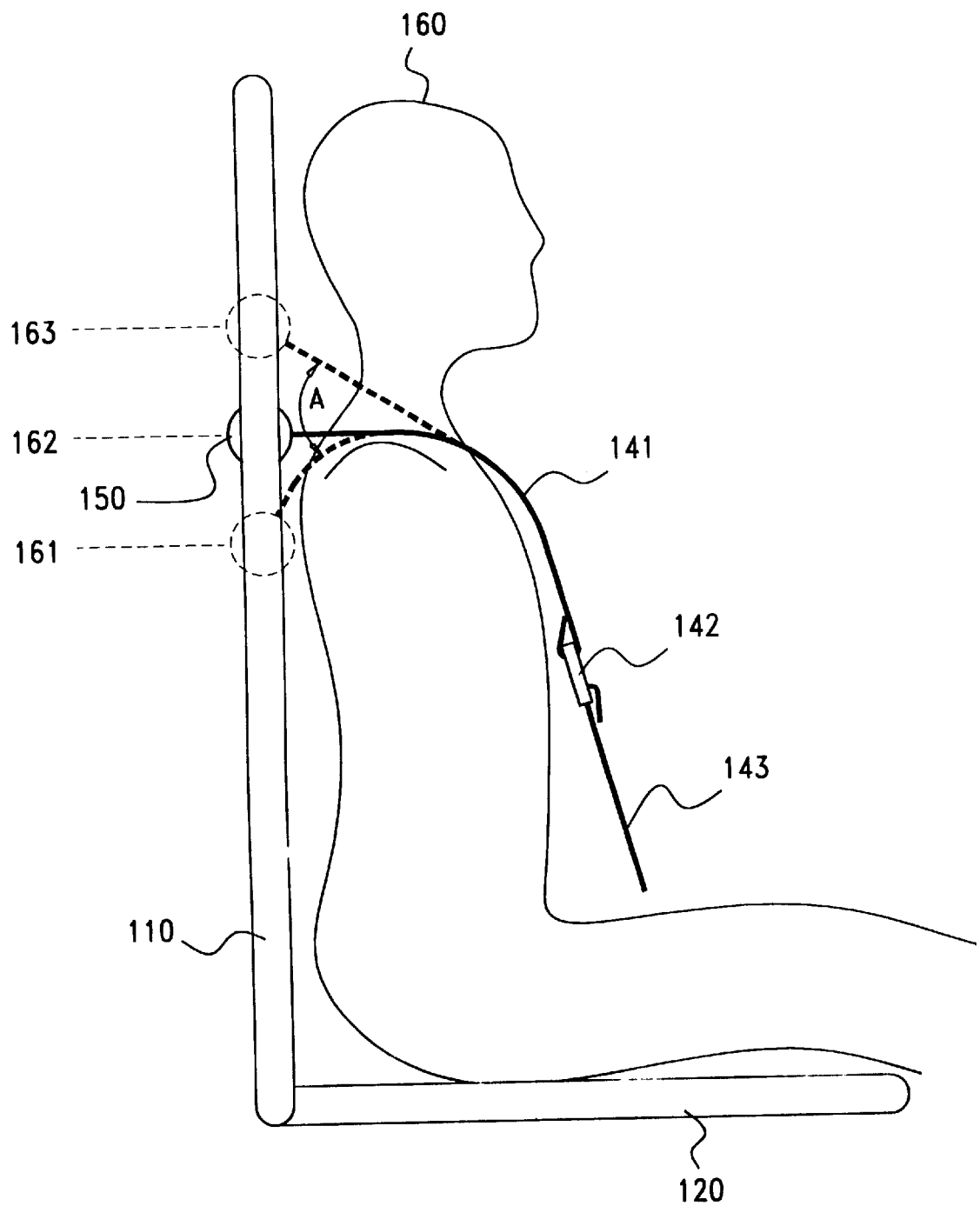
FIG. 4 is a schematic side elevation of the embodiment of FIG. 1 showing how the height of the shoulder harness can be adjusted.

FIGS. 1–4 illustrate an embodiment of a seat 100 according to the present invention equipped with an adjustable shoulder harness 140. The illustrated seat 100 is intended to be used as a troop seat for a helicopter, i.e., a seat for use by a passenger of the helicopter as opposed to a seat for use by a crew member, but a seat according to the present invention is not limited to use with any one type of occupant or with any particular type of aircraft. The overall structure of the seat 100 may be conventional. The illustrated seat 100 includes a seat back 110 for supporting the back of a seat occupant and a seat bottom 120 connected to the seat back 110 for supporting the buttocks of the seat occupant. The seat back 110 and the seat bottom 120 may have any structure that enables them to support a seat occupant in a desired manner. For example, in the illustrated embodiment, the seat back 110 and the seat bottom 120 comprise generally rectangular frames made of tubes, rods, plates, angles, or any other desired structural members. The seat back 110 includes a pair of parallel legs 111 on its widthwise sides extending in the height direction of a seat occupant and one or more unillustrated crosspieces extending between the legs 111. The seat bottom 120 may be pivotally connected to the seat back 110 to enable the seat bottom 120 to be rotated upwards to a raised position substantially parallel to the seat back 110 when not in use. In its lowered position, the seat bottom 120 is supported by a pair of straps 125, each of which has an upper end secured to one of the legs 111 of the seat back 110 and a lower end secured to the seat bottom 120. The back of a seat occupant is supported by a flexible back support 116 which extends from an upper portion of the seat back 110 to the seat bottom 120, although a cushion or other type of back support may instead be employed. The seat 100 may be equipped with other conventional equipment, such as a lap belt 130, a headrest 131, and a seat cushion on the seat bottom 120. While the illustrated seat 100 is of a folding type, it may also be one in which the seat bottom 120 is maintained at a constant angle with respect to the seat back 110.

The seat back 110 may be equipped with fittings 115 by which it can be mounted on a bulkhead or a side wall of a helicopter, or on a frame mounted on the floor or the ceiling of the helicopter. Alternatively, the seat 100 may be equipped with legs adapted for mounting on the floor of the helicopter.

The seat 100 is further equipped with a shoulder harness 140 for restraining one or both shoulders of a seat occupant. Shoulder harnesses come in a variety of forms, including those having a single shoulder strap that passes over a single shoulder and then diagonally across the torso of the seat occupant, and those having two shoulder straps, each of which passes over a corresponding one of the shoulders of the seat occupant (straps could crisscross over each other for additional lateral retention. A seat according to the present invention can be equipped with either of the above types of shoulder harness. The illustrated embodiment employs the latter type, including two shoulder straps 141 each having a first or rear end anchored behind the shoulders of the seat occupant and a second or front end restrained in any suitable manner on the front side of the seat occupant. For example, the second end of each shoulder strap 141 may be detachably secured to a conventional quick release buckle 132 that also connects to the lap belt 130. The shoulder harness 140 is arranged such that the tightness of each shoulder strap 141 against the corresponding shoulder of the seat occupant can be adjusted by the seat occupant. For example, each shoulder strap 141 may be equipped with a conventional adjuster 143 and adjusting strap 144. The adjuster 143 is connected to the second end of the shoulder strap 141. The lower end of the adjusting strap 144 is connected to the quick release buckle 132, and the upper or free end of the adjusting strap 144 passes through and frictionally engages the adjuster 143. The seat occupant can tighten the shoulder straps 141 by pulling on the free end of each adjusting strap 144 to shorten the distance between the adjuster 143 and the quick release buckle 132. This and other mechanisms for adjusting the tightness of a shoulder strap are well known in the art, and the present invention is not restricted to the use of any particular tension adjusting mechanism.

The first ends of the shoulder straps 141 can be anchored on a bulkhead or other member on which the seat 100 is mounted, but usually they will be anchored on the seat back 110, since it is frequently desirable for the entire seat 100, including the shoulder harness 140, to be readily detachable from the structure on which the seat 100 is mounted. Alternatively, shoulder straps 141 may be connected to an inertia reel (not shown). Regardless of the location where the first ends of the shoulder straps 141 are mounted, they are preferably mounted in a manner so as to be able to translate in the height direction of a seat occupant in response to tensile forces acting on the shoulder straps 141 to assume a position in which the shoulder straps 141 form a shoulder strap angle of between about 0° and about 30°. More preferably, shoulder straps 141 form a shoulder strap angle of about 0°; i.e., shoulder straps 141 extend roughly perpendicular to a line tangent to the seat back 110. As used herein, the term "shoulder strap angle" refers to the angle measured from the occupant's shoulders to the pull off point or the point of attachment of shoulder straps 141. An exemplary shoulder strap angles is depicted as angle A in FIG. 4.

In the present embodiment, as illustrated in FIGS. 2 and 3A–C, the first end of each shoulder strap 141 is secured by a conventional fitting 142 to a movable support member comprising a bar 150 which extends between the legs 111 of the seat back 110. Each lengthwise end of the bar 150 is movably supported by the seat back 110 to enable the bar 150 to translate in the lengthwise direction of the seat back 110, which is also the height direction of a seat occupant. The bar 150 may be movably connected to the legs 111 in any convenient manner. In the illustrated example, each lengthwise end of the bar 150 is slidably received in a pair of parallel longitudinally extending slits 112 formed in opposite sides of each leg 111 of the seat back 110. The bar 150 may be equipped with nuts, retaining rings, or other members on its ends to restrict lateral movement of the bar 150 in the slits 112. The range of movement of the bar 150 in the lengthwise direction of the seat back 110 may be selected based on the expected range of shoulder heights of seat occupants. In the present embodiment, when the bar 150 is in its lowest position, the distance from the seat bottom 120 to the bar 150 measured in the lengthwise direction of the seat back 110 is approximately equal to the buttocks-to-shoulder distance for a seat occupant in the 3rd percentile according to height of the predicted population of seat occupants (approximately 19 inches for the 3rd percentile of females). Furthermore, when the bar 150 is in its highest position, the distance from the seat bottom 120 to the bar 150 measured in the lengthwise direction of the seat back 110 is at least equal to the buttocks-to-shoulder distance for a seat occupant in the 98th percentile according to height of the predicted population of seat occupants (approximately 27 inches for the 98th percentile of males). That is, bar 150 has about a 7.5-inch range of movement. With this range of movement, the bar 150 can be moved to a position in which the shoulder straps 141 when tightened extend substantially perpendicular to the back tangent line for any seat occupant ranging in size from the 5th percentile of females to the 95th percentile of males.

When a seat occupant initially sits on a seat 100 according to the present invention and begins to put on the shoulder harness 140, the shoulder straps 141 will at first be loose, and the bar 150 will be in an initial position, which may be higher or lower than the shoulders of the seat occupant. When the seat occupant tightens the shoulder straps 141 to their ordinary tightness appropriate for airborne operation of the helicopter, the tension in the shoulder straps 141 will exert a force on the bar 150, the force having a forward component and possibly an upwards or downwards component in the lengthwise direction of the seat back 110, depending upon the initial position of the bar 150. If the initial position of the bar 150 is lower than the seat occupant's shoulders, as shown by reference number 161 in FIG. 4, the force applied to the bar 150 by the tightening of the shoulder straps 141 will have an upwards component, so the bar 150 will slide upwards along the legs 111 in the lengthwise direction of the seat back 110 until the force exerted by the shoulder straps 141 no longer has an upward component. At this point, the bar 150 will positioned as shown by reference number 162 in FIG. 4 such that the shoulder straps 141 extend substantially perpendicular to the legs 111 and substantially perpendicular to the back tangent line of the seat occupant, which is the ideal orientation for the shoulder straps 141. If the initial position of the bar 150 is higher than the seat occupant's shoulders, as shown by reference number 163 in FIG. 4, the force applied to the bar 150 by the tightening of the shoulder straps 141 will have a downwards component in the lengthwise direction of the seat back 110, so the bar 150 will slide downwards along the legs 111 until the force exerted by the shoulder straps 141 no longer has a downward component, and the bar 150 will positioned as shown by reference number 162 such that the shoulder straps 141 extend substantially perpendicular to the back tangent line of the seat occupant. Once the shoulder straps 141 have been tightened, as long as they remain tight, the bar 150 will be unable to move, so the shoulder straps 141 will remain in their ideal orientation with respect to the seat occupant. If the shoulder straps 141 are subsequently loosened, the bar 150 may deviate from its ideal location under the force of gravity, but once the shoulder straps 141 are retightened, the bar 150 will be restored to its proper location.

The resistance to movement of the bar 150 in the lengthwise direction of the seat back 110 is preferably sufficiently low that the ordinary tension required to tighten the shoulder straps 141 is adequate to move the bar 150 along the seat back 110. Thus, the seat occupant need not be aware of the fact that he is adjusting the position of the bar 150 but can do so unconsciously as he is tightening the shoulder straps in the customary manner.

A seat according to the present invention enables a shoulder harness to be automatically adjusted to its optimal position for the great majority of seat occupants, so the danger of injuries to a seat occupant due to a shoulder harness having a geometry inappropriate for the seat occupant can be largely eliminated.

What is claimed is:

1. A seat comprising:
   a seat bottom;
   a seat back extending generally vertically from said seat bottom;
   a movable support member movably mounted on said seat back; and
   a shoulder harness comprising a shoulder strap; said shoulder strap having a rear portion fixed to said movable support member.

2. The seat of claim 1, wherein said shoulder harness includes a second shoulder strap; said second shoulder strap having a rear portion fixed to said movable support member.

3. The seat of claim 2, wherein said first and second shoulder straps are fixed to opposite ends of said movable support member.

4. The seat of claim 3, wherein said opposite ends of said movable support member are slidably connected to said seat back.

5. The seat of claim 1, wherein said movable support member is capable of moving with respect to the seat back by at least about 7 inches in a vertical direction.

6. The seat of claim 1, wherein said movable support member can move vertically from approximately 19 inches from said seat bottom to approximately 27 inches from said seat bottom.

7. The seat of claim 1, wherein the movable support member is movable with respect to said seat back by a distance sufficient to cause said first shoulder strap to form a shoulder strap angle between 0 degrees and 30 degrees.

8. The seat of claim 7, wherein said shoulder strap angle is about 0 degrees.

9. The seat of claim 1, wherein said shoulder strap includes a second end having an adjuster and adjusting strap configured to allow adjustment of said movable support member in a vertical direction.

10. The seat of claim 2, wherein said first and second shoulder straps each have a second end having an adjuster and adjusting strap configured to allow adjustment of said movable support member in a vertical direction.

11. A seat comprising:
    a seat bottom;
    a seat back associated with said seat bottom; said seat back comprising a pair of generally parallel legs extending in a vertical direction from said seat bottom, said parallel legs each having a slit therein;
    a movable support member extending between said parallel legs and being vertically-slidably disposed in said slits; and
    a shoulder harness comprising a shoulder strap having a rear end fixed to said movable support member.

12. The seat of claim 11 wherein said slits are at least about 7 inches long.

13. The seat of claim 11, wherein said slits extend from about 19 inches to 27 inches from said seat bottom.

14. The seat of claim 11, wherein said shoulder strap includes an adjuster for adjusting the position of said movable support member in said slits.

15. The seat of claim 11, wherein said seat bottom is pivotally connected to said seat back.

16. The seat of claim 15, wherein said seat bottom is supported by a pair of straps.

17. A method of adjusting a shoulder harness for a seat comprising:
    placing a shoulder strap of a shoulder harness for a seat over a shoulder of a seat occupant;
    tightening the shoulder strap to exert a tensile force on a rear portion of said shoulder strap attached to a movably mounted support member, thereby moving said support member to a desired height.

18. The method of claim 17, wherein said tightening step comprises actuating an adjuster on a front portion of said shoulder strap.

19. The method of claim 17, wherein said tightening step forms a shoulder strap angle of between about 0 degrees and about 30 degrees.

20. The method of claim 17, further comprising:
    placing a second shoulder strap over a second shoulder of said seat occupant, and wherein said tightening step comprises actuating said shoulder straps to move said support member to a desired position.

* * * * *